(12) United States Patent
Nelson et al.

(10) Patent No.: US 11,087,597 B2
(45) Date of Patent: Aug. 10, 2021

(54) SPORTS BETTING TICKET HANDLING

(71) Applicant: IGT, Las Vegas, NV (US)

(72) Inventors: Dwayne Nelson, Las Vegas, NV (US); Patrick Danielson, Las Vegas, NV (US); Julian Turner, Las Vegas, NV (US)

(73) Assignee: IGT, Las Vegas, NV (US)

( * ) Notice: Subject to any disclaimer, the term of this patent is extended or adjusted under 35 U.S.C. 154(b) by 97 days.

(21) Appl. No.: 16/507,662

(22) Filed: Jul. 10, 2019

(65) Prior Publication Data

US 2021/0012619 A1 Jan. 14, 2021

(51) Int. Cl.
*G07F 17/42* (2006.01)
*G07F 17/32* (2006.01)

(52) U.S. Cl.
CPC ...... *G07F 17/3288* (2013.01); *G07F 17/3209* (2013.01); *G07F 17/3244* (2013.01); *G07F 17/42* (2013.01)

(58) Field of Classification Search
CPC ............. G07F 17/3288; G07F 17/3209; G07F 17/3244; G07F 17/42
USPC ......................................................... 463/25
See application file for complete search history.

(56) References Cited

U.S. PATENT DOCUMENTS

| | | | |
|---|---|---|---|
| 9,870,673 B2 | 1/2018 | Nanni | |
| 2007/0060322 A1* | 3/2007 | Benrus | G07F 17/32 463/28 |
| 2008/0132314 A1* | 6/2008 | Robb | G07F 17/32 463/17 |
| 2008/0248846 A1 | 10/2008 | Stronach | |
| 2015/0364009 A1* | 12/2015 | Keech | G07F 17/3227 463/28 |
| 2017/0092076 A1* | 3/2017 | Anderson | G07F 17/3246 |

* cited by examiner

*Primary Examiner* — Allen Chan
(74) *Attorney, Agent, or Firm* — Sage Patent Group

(57) ABSTRACT

Systems, methods and apparatus are provided. An apparatus includes a user interface, a processing circuit, a ticket printer that prints tickets that display wager data, and a memory coupled to the processing circuit. The memory includes machine readable instructions that, when executed by the processing circuit, cause the processing circuit to receive, from a player via the user interface, wager inputs corresponding to multiple wagers that correspond to predicted outcomes of multiple events that include a first event and a second event and to cause the printer to print first wager data corresponding to the first event on a first ticket and to print second wager data corresponding to the second event on a second ticket. Each of the first and second tickets include wager data corresponding to multiple ones of the wagers.

18 Claims, 7 Drawing Sheets

SPORTS BETTING TICKET HANDLING

BACKGROUND

Embodiments described herein relate to sports betting and, in particular, to ticket handling in sports betting.

Wagering tickets may be used in a variety of ways in gaming. One example includes tickets that are printed responsive to receiving a sports betting wager. For example, a sports betting terminal or kiosk allows the player to place wagers on one or more sports and/or horse race events. The player can anonymously use the terminal or log into a player account. When the player is anonymous the terminal prints a sports betting ticket listing each of the events and the wager. In circumstances in which a player is placing numerous different wagers in a single wagering session, the betting terminal/kiosk may generate many single tickets, each corresponding to individual wagers. Given that some betting terminals/kiosks may only hold several hundred tickets for printing, betting terminals/kiosks serving high-volume players may require frequent service to replenish the ticket supply.

BRIEF SUMMARY

A system includes a communication interface, a user interface, a processing circuit, a ticket printer that prints tickets that display wager data, and a memory coupled to the processing circuit. The memory includes machine readable instructions that, when executed by the processing circuit, cause the processing circuit to receive, from a player via the user interface, wager inputs corresponding to multiple wagers that correspond to predicted outcomes of multiple events, to identify which of the wagers to memorialize on a ticket, and to cause the printer to print the ticket that includes wager data corresponding to multiple ones of the wagers that are identified to print.

Some embodiments are directed to methods that include operations of receiving, via a user interface, multiple wager inputs corresponding to multiple wagers that are made by a player during a wagering session. Operations include identifying, using a processing circuit, ones of the wagers to memorialize on a ticket that is provided to the player, generating, using the processor, wager data that corresponds to the ones of the wagers that are identified to be printed, and providing the player with the ticket that includes the wager data.

Some embodiments are directed to an apparatus that includes a user interface, a processing circuit, a ticket printer that prints tickets that display wager data, and a memory coupled to the processing circuit. The memory includes machine readable instructions that, when executed by the processing circuit, cause the processing circuit to receive, from a player via the user interface, wager inputs corresponding to multiple wagers that correspond to predicted outcomes of multiple events that include a first event and a second event. The processing circuit further causes the printer to print first wager data corresponding to the first event on a first ticket and to print second wager data corresponding to the second event on a second ticket. Each of the first and second tickets includes wager data corresponding to multiple ones of the wagers.

DETAILED DESCRIPTION

Embodiments described herein provide a technical solution to the technical problem of reducing the replenishment rate of paper tickets in sports betting terminals. To avoid wasting paper by printing tickets with each in play wager, some embodiments herein propose queuing up real time wagers and printing them all at once onto a single ticket even if the wager has been evaluated. Some embodiments herein provide other techniques for grouping tickets to save paper.

Sports betting and horse racing, including competitions involving individual competitors, teams and/or animal racing, such as horse and/or dog racing, can be anonymous and/or account based. Anonymous play may provide that the player does not need to provide his/her identify nor log into the terminal. Anonymous play may use a physical ticket, such as a sports bet ticket, that may be printed to represent the betting transactions. A sports bet ticket may be printed with the player's sports wagers. A cash out ticket may be printed to remove credits/money from the terminal.

Figure 1:
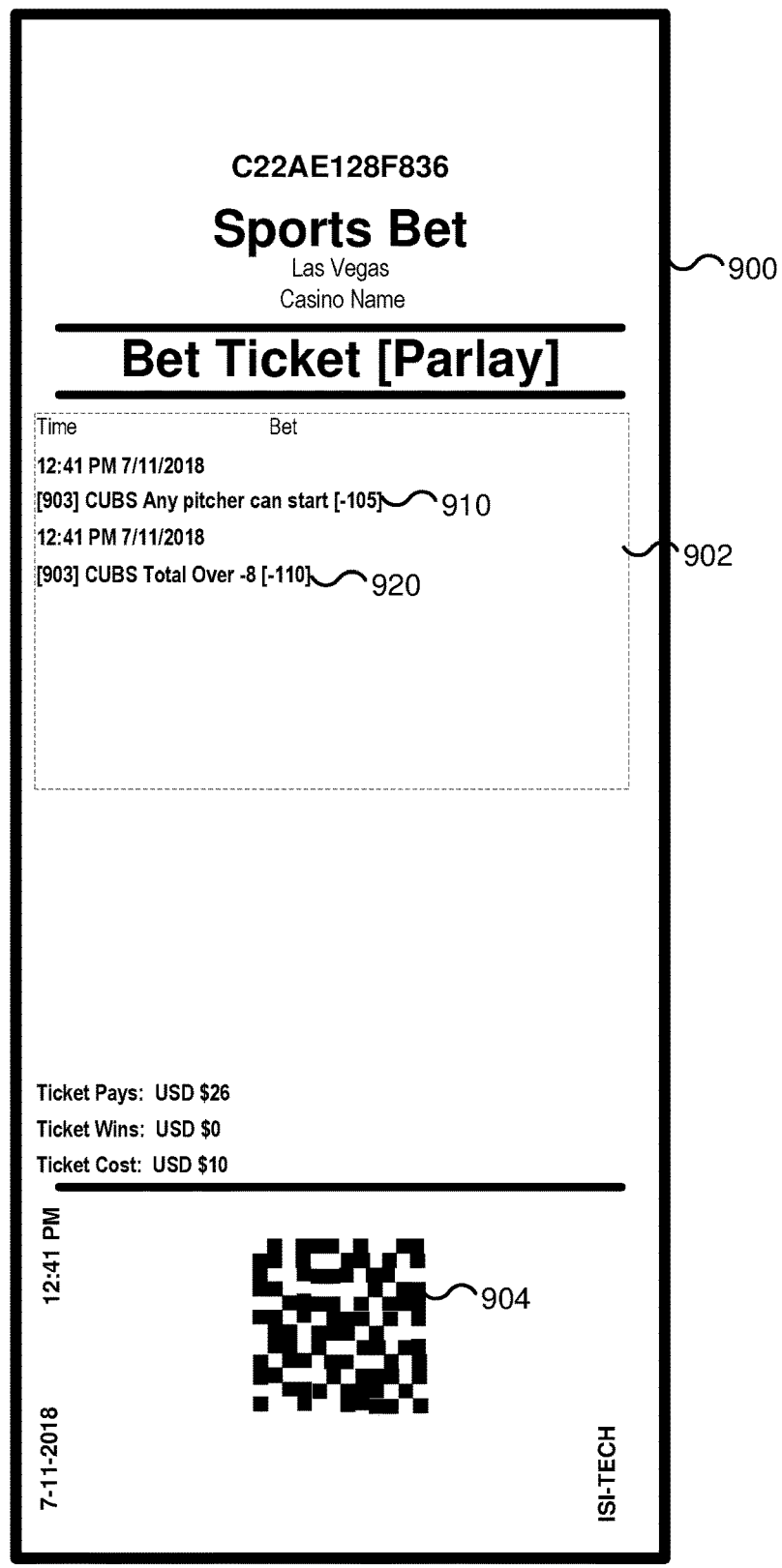
FIG. 1 is a schematic sample sports bet ticket according to some embodiments.

Reference is now made to FIG. 1, is a schematic sample sports bet ticket 900 according to some embodiments. The sports bet ticket 900 includes a wager area 902 that lists the sports wagers. In some embodiments, descriptions corresponding to multiple wagers may be printed in the wager area 902. For example, a group of sports wagers printed in the wager area 902 may include a first sports wager 910 and a second sports wager 920. Some embodiments provide that the sports bet ticket 900 includes a machine-readable code that includes data corresponding to the wager. In some embodiments, the machine-readable code may include an optically scannable code 904, such as a one or more dimensional bar code, among others. The optically scannable code 904 may uniquely represent the wagers. In some embodiments, the sports bet ticket 900 may be redeemed by having the optically scannable code read at a sports betting terminal, kiosk or other cash-out mechanism. In some embodiments, a sports betting server may identify the value in the optically scannable code 904 as a given transaction number. The transaction number may represent the list of sports wagers on the sports bet ticket 900.

In some embodiments, the sports bet ticket 900 may be printed to include only a portion of the wagers made during a wagering session. For example, a sports bet ticket may only include descriptions corresponding to wagers that have been determined to have a winning outcome and avoid printing descriptions corresponding to wagers that are known to have a losing outcome for the player and/or in which the game outcome is already determined as a winning outcome and that have been redeemed.

In some embodiments, the sports bet ticket may be virtualized. In such embodiments an image of a sports bet ticket may be generated responsive to the player making a sports wager. In some embodiments, such images may be displayed to the player on a screen of a betting terminal and/or a mobile device. Some embodiments provide that if the sports bet ticket for an event is a loser for the player, the betting terminal may avoid printing such sports bet ticket. In some embodiments, the betting terminal or sports wagering system may store all of the images of the virtual tickets, including information corresponding to each virtual ticket.

If the sports bet ticket is a winner for the player, the betting terminal may redeem the sports bet ticket immediately by transferring the win amount to a player's balance.

Some embodiments provide that the sports bet ticket may include descriptions of wagers that correspond to events that have not yet occurred and that such sports bet ticket may be generated based on a player actuating a cashout button or other similar user input. In this manner, the sports bet ticket may only include descriptions of wagers based on events that have not yet occurred.

Some embodiments provide that real-time wagers may be grouped on one or more sports bet tickets. With real time sports betting, which may also be referred to as in-play or in-game wagering, the player can bet on individual plays of one or more sporting events. Non-limiting examples include that the next play will advance 3 yards or the team will pass the ball on the next play. If the player is anonymously using the kiosk to make these types of wagers, a wager could be made every minute or so. If the terminal were to print a ticket for each wager, the printer may be out of paper quickly because the player can place dozens of real time bets in an hour.

Embodiments herein provide that a betting terminal dispenses the real-time tickets in batches using different techniques. In some embodiments, a betting terminal prints a ticket responsive to a sufficient number of real-time wagers are placed to fill the wager portion of the sports bet ticket. In such embodiments, some of the real-time events may have passed when the ticket is printed. Some embodiments provide that the player may be able to see all of the real-time wagers on a display screen of the betting terminal or mobile device.

In some embodiments, the betting terminal may wait a given time before printing the ticket, such as, for example, every five minutes. Other embodiments provide that the time interval is more or less than 5 minutes.

In some embodiments, the terminal waits for certain game events to print such as after a possession change, at the end of a quarter or at a time out, among others.

In some embodiments, the betting terminal may wait until the player provides a cashout input to the betting terminal to print the sports bet ticket including descriptions of the real-time wagers. Responsive to the player providing the cashout input, the betting terminal may print one or more tickets with all of the unprinted real-time bets. Some embodiments provide the betting terminal may also print a cashout ticket. In some embodiments, the betting terminal includes an input that causes only the real-time wagers to be printed.

In some embodiments, the betting terminal may print the real time bets responsive to the player logging out or walking away from the betting terminal.

In some embodiments, the betting terminal does not print a ticket for losing real time bets that have been placed and that have already lost. In some embodiments, the betting terminal allows the player to choose whether or not to print losing real-time wagers. Some embodiments provide that the betting terminal may receive an input from the player that causes the betting terminal to print a sports bet ticket that only includes losing wagers.

In some embodiments, a single ticket can represent both real time wagers and a cash voucher. When the player finishes betting, the betting terminal can print a single ticket with all of the winning wagers and the cash value. Some embodiments provide that such sports bet ticket would include a bar code for the sports wagers and a bar code for the cash value. Of course, there could be more wagers than will fit on a single ticket. In that case multiple tickets could be printed with multiple winning sports wagers. In some embodiments, the terminal could print rolled paper such that all wagers and cashout value can be printed onto a single long sheet of printed paper.

If there are unsettled wagers, a separate, unsettled sports bet ticket can be printed.

Although some examples disclosed herein are directed to real-time betting, some embodiments provide that such techniques may be applied to regular sports wagering and/or race horse wagering, among others. The operations may be used if a player places wagers on multiple NFL games for the week by printing all the wagers on a single ticket.

Some embodiments provide that a player may be able to selectively organize wagers on sports bet tickets. For example, a player may group sports wagers by team, sport, type, date, etc. and the betting terminal may print only one group per ticket. For example, the betting terminal may print the football games on one ticket and the basketball games on another. The betting terminal may print all of today's games on one ticket and all of tomorrow's games on another ticket. In some embodiments, these groupings may be automatic, be configured by the operator and/or be configured by the player.

Figure 2:
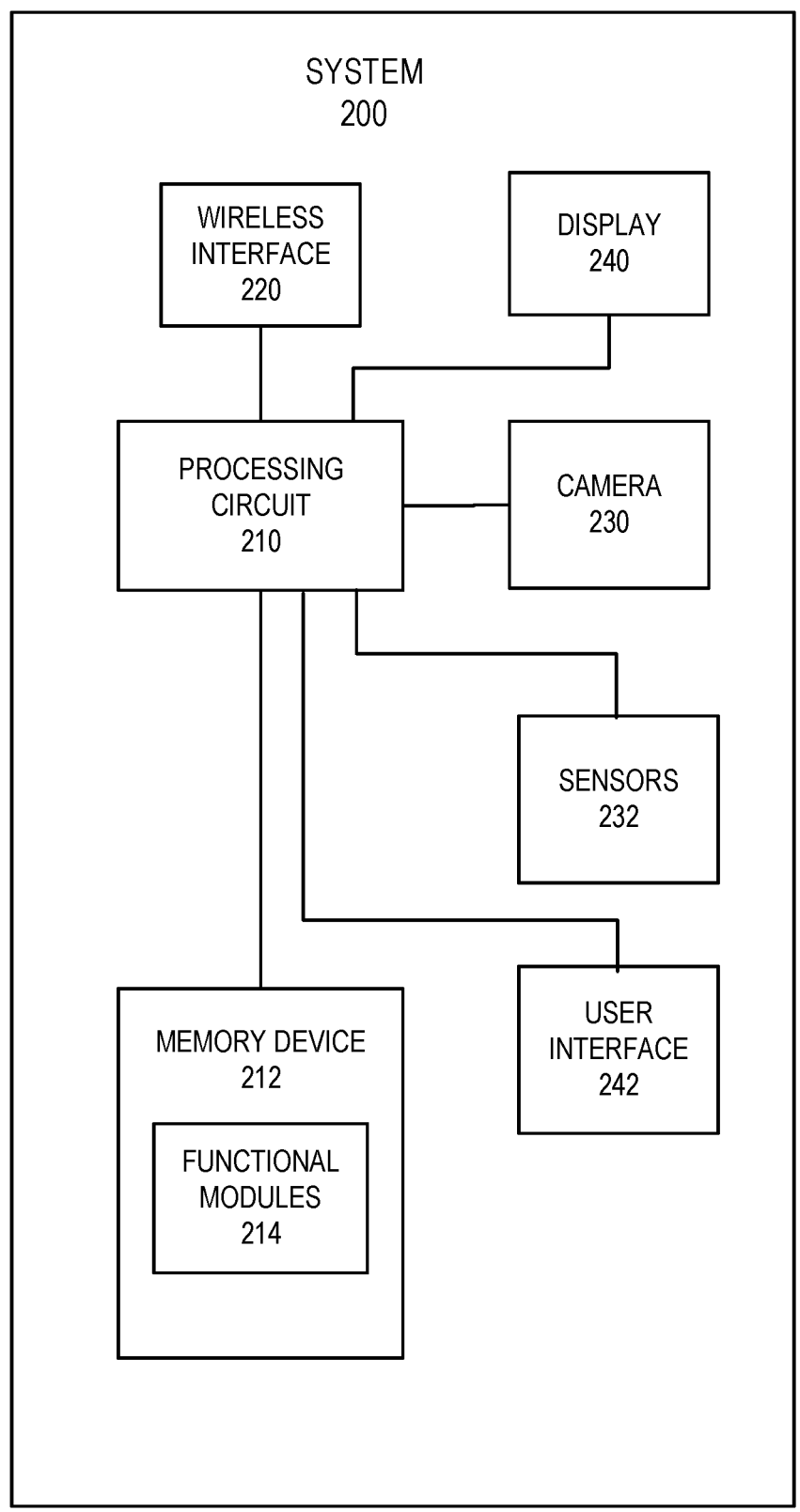
FIG. 2 is schematic block diagram that illustrates various components of system according to some embodiments.

Reference is now made to FIG. 2, which is a schematic block diagram that illustrates various components of system that performs operations according to some embodiments. As shown in FIG. 2, the system 200 may include a processing circuit 210 that controls operations of the system 200. Although illustrated as a single processing circuit, multiple special purpose and/or general-purpose processors and/or processor cores may be provided in the system 200. For example, the system 200 may include one or more of a video processor, a signal processor, a sound processor and/or a communication controller that performs one or more control functions within the system 200. The processing circuit 210 may be variously referred to as a "controller," "microcontroller," "microprocessor" or simply a "computer." The processing circuit 210 may further include one or more application-specific integrated circuits (ASICs).

Various components of the system 200 are illustrated in FIG. 2 as being connected to the processing circuit 210. It will be appreciated that the components may be connected to the processing circuit 210 through a system bus, a communication bus and controller, such as a USB controller and USB bus, a network interface, or any other suitable type of connection.

The system 200 further includes a camera 230 for generating a video signal and a display 240 for displaying graphics to a user. The system 200 further includes a memory device 212 that stores one or more functional modules 214 for performing the operations described herein.

The memory device 212 may store program code and instructions, executable by the processing circuit 210, to control the system 200. The memory device 210 may include random access memory (RAM), which can include volatile and/or non-volatile RAM (NVRAM) and other forms as commonly understood in the gaming industry. In some embodiments, the memory device 212 may include read only memory (ROM). In some embodiments, the memory device 212 may include flash memory and/or EEPROM (electrically erasable programmable read only memory). Any other suitable magnetic, optical and/or semi-conductor memory may operate in conjunction with the gaming device disclosed herein.

The system 200 may include a wireless interface 220 that enables the system 200 to communicate with remote devices, such as electronic gaming machines, sports betting servers, and/or mobile terminals and/or network, among others, over a wired and/or wireless communication network, such as a local area network (LAN), wide area network (WAN), cellular communication network, wireless LAN (Wifi), Bluetooth, near-field communications (NFC) or other data communication network. The wireless interface 220 may include multiple radios to support multiple types of simultaneous connections. For example, the wireless interface may include both a Wifi radio transceiver and a Bluetooth radio transceiver.

The system 200 may include a user interface 242 for receiving inputs from the user. The user interface may include a graphical user interface (GUI) that includes one or more display screen that may be touch sensitive, one or more indicator lights, buttons, and/or knobs, among others.

Figure 3:
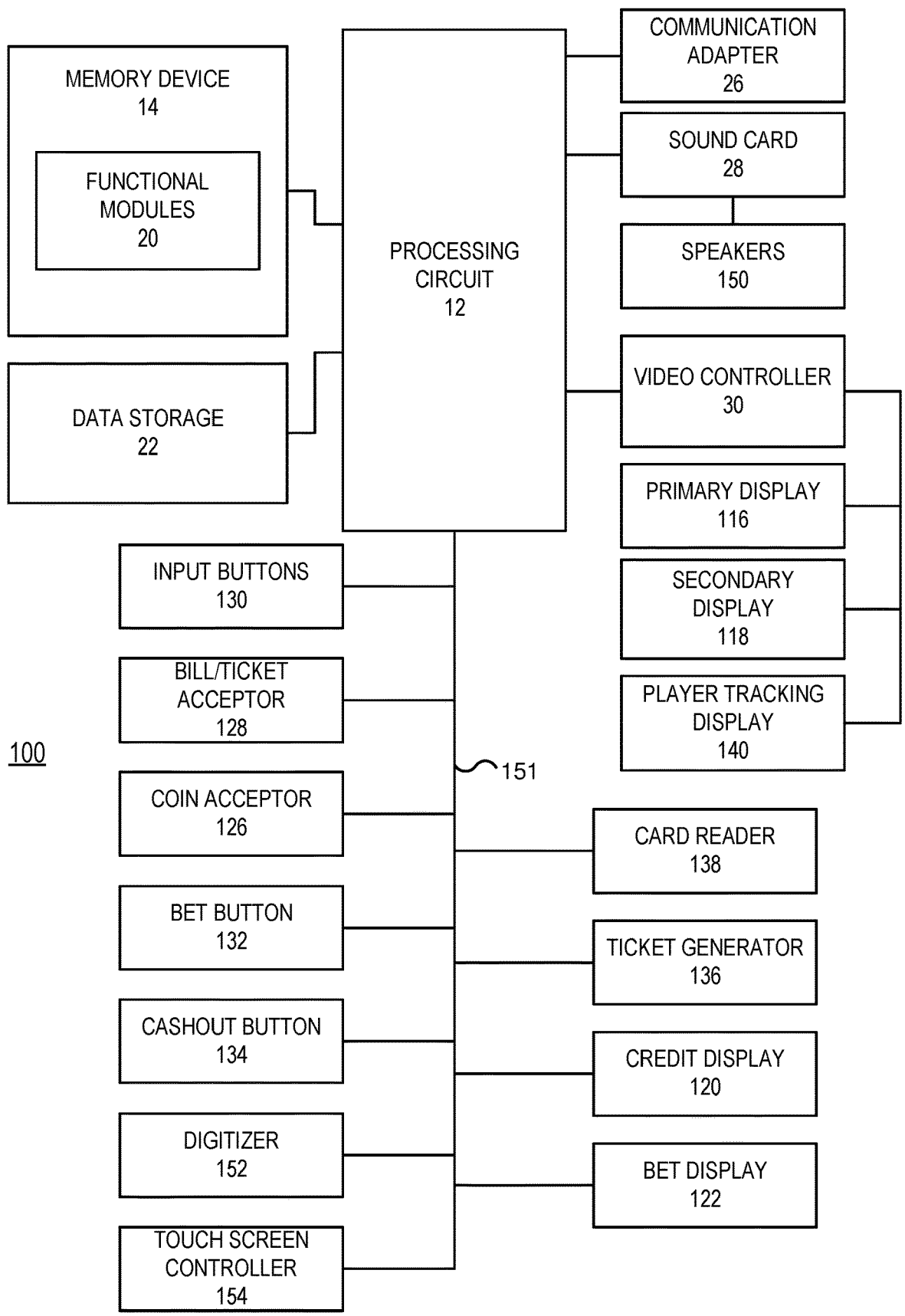
FIG. 3 is a schematic block diagram illustrating an electronic configuration for a betting terminal according to some embodiments.

Reference is now made to FIG. 3, is a schematic block diagram illustrating an electronic configuration for a betting terminal according to some embodiments. Embodiments herein may include different types of betting terminals and displayed in FIG. 3 as a functional block diagram that schematically illustrates an electronic relationship of various elements of a betting terminal 100. The embodiments shown in FIG. 3 are provided as examples for illustrative purposes only. It will be appreciated that betting terminals 100 may come in many different shapes, sizes, layouts, form factors, and configurations, and with varying numbers and types of input and output devices, and that embodiments of the inventive concepts are not limited to the particular betting terminal structures described herein.

Betting terminals 100 typically include a number of standard features, including a support structure, housing or cabinet which provides support for a plurality of displays, inputs, outputs, controls and other features that enable a player to interact with the betting terminal 100.

The betting terminal 100 illustrated in FIG. 3 includes a number of display devices, including a primary display device 116 and a secondary display device 118 located in an upper portion of the cabinet 105. A plurality of wagering options and/or information may displayed on a display screen of the primary display device 116. It will be appreciated that one or more of the display devices 116, 118 may be omitted, or that the display devices 116, 118 may be combined into a single display device. The betting terminal 100 may further include a player tracking display 140, a credit display 120, and a bet display 122. The credit display 120 displays a player's current number of credits, cash, account balance or the equivalent. The bet display 122 may display a player's amount wagered.

The player tracking display 140 may be used to display a service window that allows the player to interact with, for example, their player loyalty account to obtain features, bonuses, comps, etc. In other embodiments, additional display screens may be provided beyond those illustrated in FIG. 3. In some embodiments, one or more of the player tracking display 140, the credit display 120 and the bet display 122 may be displayed in one or more portions of one or more other displays that display other game related visual content. For example, one or more of the player tracking display 140, the credit display 120 and the bet display 122 may be displayed in a picture in a picture on one or more displays.

The betting terminal 100 may further include a number of input devices that allow a player to provide various inputs to the betting terminal 100, either before, during or after a wager has been placed and/or a sporting event has occurred. For example, the betting terminal 100 may include input devices that are a plurality of input buttons 130 that allow the player to select options before, during or after a wager has been placed and/or a sporting event has occurred. The betting terminal 100 may further include a bet button 132 and a cashout button 134. The cashout button 134 is utilized to receive a cash payment or any other suitable form of payment corresponding to a quantity of remaining credits of a credit display.

In some embodiments, one or more input buttons 130 of the betting terminal 100 are one or more wagering or betting devices. One such wagering or betting device includes a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154. The player may interact with the betting terminal 100 by touching virtual buttons on one or more of the display devices 116, 118, 140. Accordingly, any of the above described input devices, such as the input buttons 130, the bet button 132 and/or the cashout button 134 may be provided as virtual buttons on one or more of the display devices 116, 118, 140.

Some embodiments provide that operation of the primary display device 116, the secondary display device 118 and the player tracking display 140 may be controlled by a video controller 30 that receives video data from a processing circuit 12 or directly from a memory device 14 and displays the video data on the display screen. The credit display 120 and the bet display 122 may be implemented as simple LCD or LED displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

The display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the betting terminal 100 are generally configured to display one or more sporting event, wagering event and/or other images, symbols, and indicia. In certain embodiments, the display devices 116, 118, 140 of the betting terminal 100 are configured to display any suitable visual representation or exhibition of the movement of objects; dynamic lighting; video images; images of people, characters, places, things, teams, events, and the like.

The betting terminal 100 also includes various features that enable a player to deposit credits in the betting terminal 100 and withdraw credits from the betting terminal 100, such as in the form of a payout of winnings, credits, etc. For example, the betting terminal 100 may include a ticket dispenser 136, a bill/ticket acceptor 128, and a coin acceptor 126 that allows the player to deposit coins into the betting terminal 100.

In some embodiments, the betting terminal 100 may also include a currency dispenser 137 that may include a note dispenser configured to dispense paper currency and/or a coin generator configured to dispense coins or tokens in a coin payout tray.

The betting terminal 100 may further include one or more speakers 150 controlled by one or more sound cards 28. The betting terminal 100 may include one or more speakers 150. In other embodiments, additional speakers, such as surround sound speakers, may be provided within and/or on the cabinet. Moreover, the betting terminal 100 may include built-in seating with integrated headrest speakers.

In various embodiments, the betting terminal 100 may generate dynamic sounds coupled with attractive multimedia images displayed on one or more of the display devices 116, 118, 140 to provide an audio-visual representation or to otherwise display full-motion video with sound to attract players to the betting terminal 100 and/or to engage the player during a wagering session. In certain embodiments, the betting terminal 100 may display a sequence of audio and/or visual attraction messages during idle periods to attract potential players to the betting terminal 100. The videos may be customized to provide any appropriate information.

The betting terminal 100 may further include a card reader 138 that is configured to read magnetic stripe cards, such as player loyalty/tracking cards, chip cards, and the like. In some embodiments, a player may insert an identification card into a card reader of the betting terminal 100. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the betting terminal 100. In some embodiments, money may be transferred to a betting terminal 100 through electronic funds transfer. When a player funds the betting terminal 100, the processing circuit determines the amount of funds entered and displays the corresponding amount on the credit or other suitable display as described above.

In some embodiments, the betting terminal 100 may include an electronic payout device or module configured to fund an electronically recordable identification card or smart card or a bank or other account via an electronic funds transfer to or from the betting terminal 100.

Some embodiments provide that the betting terminal 100 may include a processing circuit 12 that controls operations of the betting terminal 100. Although illustrated as a single processing circuit, multiple special purpose and/or general purpose processors and/or processor cores may be provided in the betting terminal 100. For example, the betting terminal 100 may include one or more of a video processor, a signal processor, a sound processor and/or a communication controller that performs one or more control functions within the betting terminal 100. The processing circuit 12 may be variously referred to as a "controller," "microcontroller," "microprocessor" or simply a "computer." The processor may further include one or more application-specific integrated circuits (ASICs).

Various components of the betting terminal 100 are illustrated in FIG. 3 as being connected to the processing circuit 12. It will be appreciated that the components may be connected to the processing circuit 12 through a system bus, a communication bus and controller, such as a USB controller and USB bus, a network interface, or any other suitable type of connection.

The betting terminal 100 further includes a memory device 14 that stores one or more functional modules 20.

The memory device 14 may store program code and instructions, executable by the processing circuit 12, to control the betting terminal 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The betting terminal 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The betting terminal 100 may include a communication adapter 26 that enables the betting terminal 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the betting terminal 100 to communicate, for example, with a mobile communication device operated by a player.

The betting terminal 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processing circuit through a universal serial bus (USB) hub (not shown) connected to the processing circuit 12.

In some embodiments, the betting terminal 100 may include a sensor, such as a camera in communication with the processing circuit 12 (and possibly controlled by the processing circuit 12) that is selectively positioned to acquire an image of a player actively using the betting terminal 100 and/or the surrounding area of the betting terminal 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion.

In some embodiments, a betting terminal 100 comprises a personal device, such as a desktop computer, a laptop computer, a mobile device, a tablet computer or computing device, a personal digital assistant (PDA), or other portable computing devices. In some embodiments, the betting terminal 100 may be operable over a wireless network, such as part of a wireless gaming system. In such embodiments, the betting terminal 100 may be a hand-held device, a mobile device or any other suitable wireless device that enables a player to place sports wagers at a variety of different locations. It should be appreciated that a betting terminal 100 as disclosed herein may be a device that has obtained approval from a regulatory gaming commission or a device that has not obtained approval from a regulatory gaming commission.

Figure 4:
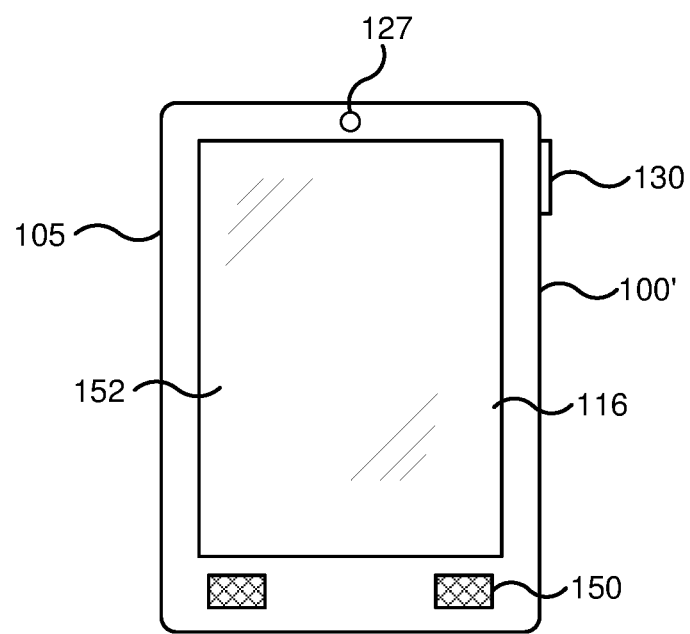
FIG. 4 is front schematic view of a betting terminal that can be configured according to some embodiments.

For example, referring to FIG. 4, a betting terminal 100' may be implemented as a handheld device including a compact housing 105 on which is mounted a touchscreen display device 116 including a digitizer 152. An input button 130 may be provided on the housing and may act as a power or control button. A camera 127 may be provided in a front face of the housing 105. The housing 105 may include one or more speakers 150. In the betting terminal 100', various input buttons described above, such as the cashout button, gameplay activation button, etc., may be implemented as soft buttons on the touchscreen display device 116. Moreover, the betting terminal 100' may omit certain features, such as a bill acceptor, a ticket generator, a coin acceptor or dispenser, a card reader, secondary displays, a bet display, a credit display, etc. Credits can be deposited in or transferred from the betting terminal 100' electronically.

In some embodiments, a betting terminal 100' may be a mobile device that may receive data corresponding to an image of a virtual sports bet ticket. In such embodiments, the mobile terminal may be used to redeem the sports bet ticket by displaying the image of the virtual sports bet ticket. These and other embodiments are described in more detail below.

Figure 5:
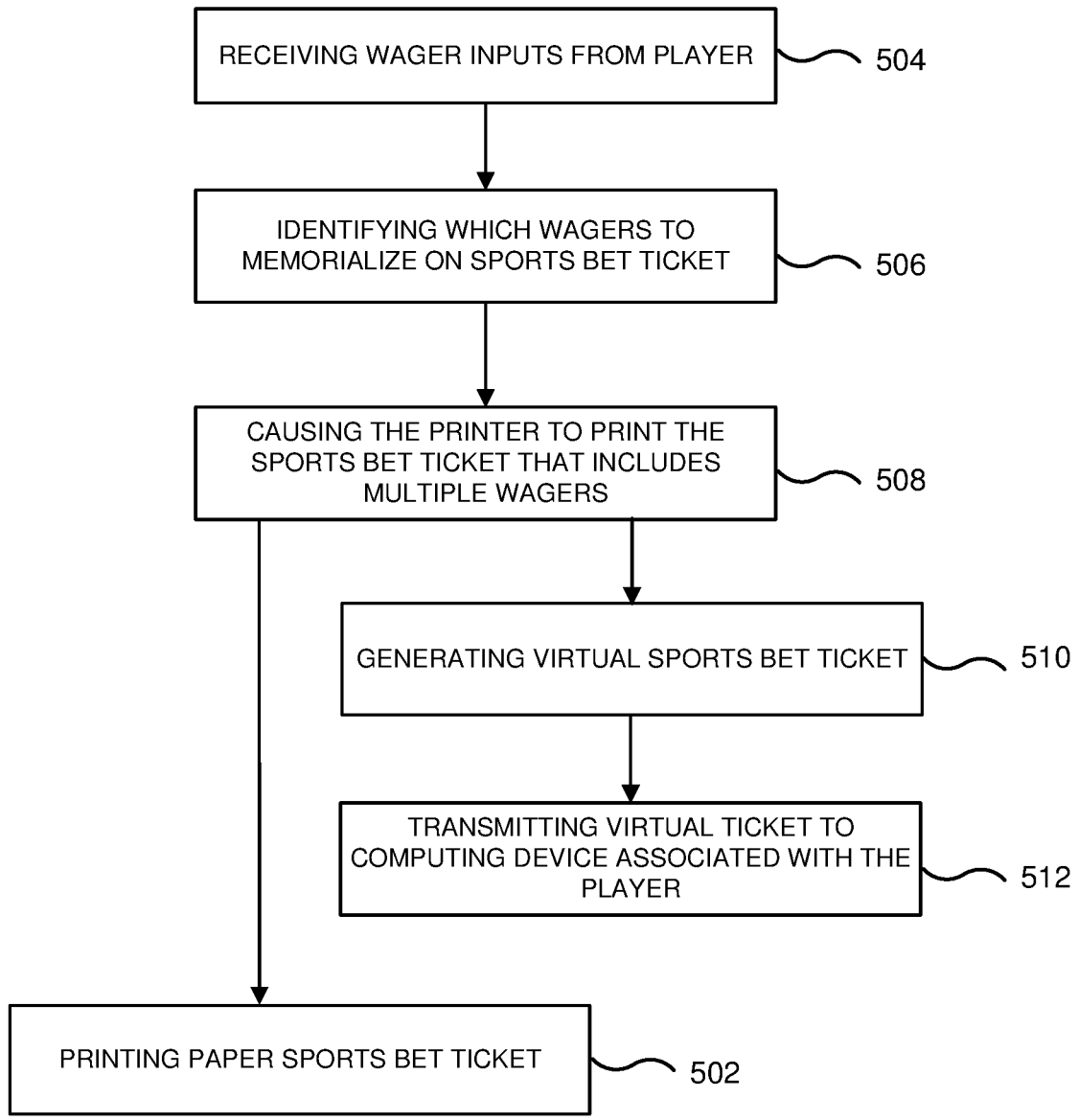
FIG. 5 is a flowchart illustrating operations of systems/methods/apparatus according to some embodiments.

Reference is now made to FIG. 5, which is a flowchart illustrating operations of systems/methods according to some embodiments. Some embodiments provide that operations are directed to printing a sports bet ticket that displays wager data that corresponds to multiple wagers that are placed by a player via a user interface. In such embodiments, the wagers may be placed responsive to a processing circuit receiving (block 504), via the user interface, a plurality of wager inputs. The wagers may be based on a predicted outcome corresponding to a plurality of events. In some embodiments, the events may include sporting events and/or multiple different outcomes occurring therein. The predicted outcomes may correspond to any number of sporting events and/or events occurring therein.

Operations may include identifying which of the plurality of wagers to memorialize on a ticket (block 506). In some embodiments, the wagers include a first portion of wagers that are winning wagers that correspond to outcomes that occur during a given time interval and that have been established as being winning wagers. In such embodiments, the sports bet ticket is printed after the given time interval and includes the wager data corresponding to the first portion of wagers. Some embodiments provide that a second portion of wagers are non-winning wagers corresponding to outcomes that occur during the given time interval. In some embodiments, the sports bet ticket is printed without including the non-winning wagers that are in the second portion of wagers.

In some embodiments, the first portion of wagers include those with outcomes that occur during a given time interval. Some embodiments provide that the given time interval begins when a player logs in to the betting terminal via the user interface. Some embodiments provide that the given time interval ends when the player logs out of the betting terminal via the user interface.

In some embodiments, the given time interval begins responsive to receiving a first wager and ends responsive to receiving a cashout signal from the player via the user interface. Some embodiments provide that the given time interval includes a first time interval and a second time interval that is after the first time interval. A first portion of wagers may correspond to wagers with outcomes that occur during the first time interval and a second portion of wagers correspond to wagers with outcomes that occur during the second time interval. In such embodiments, the sports bet ticket is printed after the first time interval and includes wager data corresponding to the second portion of wagers and not the first portion of wagers.

In some embodiments, the given time interval includes a first time interval and a second time interval that is different than the first time interval. A first event may occur during the first time interval and a second event may occur during the second time interval. In such embodiments, the sports bet ticket includes a first ticket that includes wager data corresponding to the first event and a second ticket that is different from the first ticket and that includes wager data corresponding to the second event. Some embodiments provide the first and second events occur within a same sporting game being played while other embodiments provide that the first and second events correspond to different games and/or types of games being played. For example, the first and second events may be events that occur within a given football game. Alternatively, the first event may occur in a first game and the second event may occur in a different game and/or in a different sport altogether. In some embodiments, the first portion of wagers may be based on a first type of event and a second portion of wagers may be based on a second type of event. Some embodiments provide that the sports bet ticket includes a first ticket that includes wager data corresponding to the first portion of wagers and the first type of event and a second sports bet ticket that includes wager data corresponding to the second portion of wagers and the second type of event.

In some embodiments, the sports bet ticket includes wager data corresponding to all of the wagers placed during a wagering session. Some embodiments provide that the wagers include settled wagers that have determined outcomes and unsettled wagers that have undetermined outcomes. In some embodiments, the sports bet ticket includes a first group of wager data corresponding to the settled wagers and a second group of wager data corresponding to the unsettled wagers. Some embodiments provide that the first and second groups are visually distinctive from one another on the ticket.

Operations may include causing the printer to cause the printer to print the sports bet ticket that includes wager data corresponding to multiple wagers that are identified to print (block 508). In some embodiments, the printer is further caused to print the sports bet ticket to include the wager data and cash balance data corresponding to a cash balance that is transferred to the player. Thus, the player may be able to use the sports bet ticket to memorialize wagers and to transfer a cash balance from a betting terminal.

In some embodiments, the wager data on a sports bet ticket includes a first encoded image. Some embodiments provide that the cash balance data includes a second encoded image. In such embodiments, the encoded images are machine readable, such as by using an optical reader.

In some embodiments, the user interface is configured to receive a ticket printing input that identifies which of the wagers to memorialize on the sports bet ticket. In some embodiments, the sports bet ticket includes wager data that corresponds to the ticket printing input.

In some embodiments, operations include printing a paper sports bet ticket (block 502). Some embodiments provide that operations may include generating a virtual ticket that includes an image of a sports bet ticket that includes the wager data (block 510). In some embodiments, the virtual ticket comprises data corresponding to an image of wager data of a sports bet ticket. In some embodiments, the virtual ticket is transmitted, via the communication interface, to a computing device that is associated with the player (block 512).

In some embodiments, operations may include receiving multiple sports bet tickets from a user. Some embodiments provide that the multiple sports bet tickets correspond to a single or multiple different wagering sessions. In such embodiments, an input may be received from the user via the user interface that identifies which of the wagers should be printed together on a single ticket. In such embodiments, the printer may be caused to print one or more sports bet tickets that include wagering data corresponding to the multiple sports bet tickets received from the user.

Figure 6:
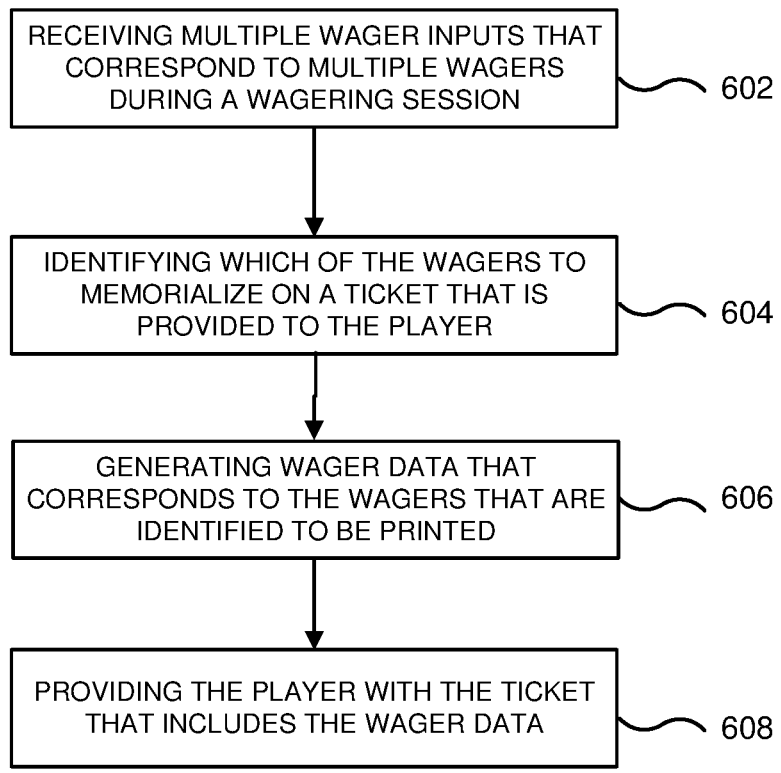
FIG. 6 is a flowchart illustrating operations of systems/methods/apparatus according to some embodiments.

Reference is now made to FIG. 6, which is a flowchart illustrating operations of systems/methods/apparatus according to some embodiments. Operations include receiving, via a user interface, multiple wager inputs that correspond to multiple wagers that are made by a player during a wagering session (bock 602). For example, at a sports betting terminal, a player may place many different wagers corresponding to individual outcomes that may occur in a single sporting event. In some embodiments, the outcomes may be determined during the sporting event and before the wagering session has ended while some of the outcomes may be undetermined at the end of the wagering session.

Operations include identifying, using a processing circuit, ones of the wagers to memorialize on a ticket that is provided to the player (block 604). For example, the wagers having a determined outcome before the wagering session is ended may not be identified to be memorialized on the ticket. In some embodiments, wagers have a winning outcome may be identified to be printed whereas wagers having a losing outcome may not be printed.

In some embodiments, the wagers include a first portion of wagers that have outcomes that are determined in a given time interval and a second portion of wagers that have outcomes that are not determined during in the given time interval. In such embodiments, the second portion of wagers may be printed while the first portion of wagers may not be printed. In some embodiments, the first portion of wagers includes wagers that will be determined during a first time interval and the second portion of wagers includes wagers that will be determined during a second time interval that is after the first time interval. The first time interval may correspond to a given day and the second time interval may correspond to a different day. In such embodiments, a ticket may be printed for each of the first and second time intervals. For example, a first ticket may be printed to include wagers that will be determined on the first day and a second ticket may be printed to include wagers that will be determined on the second day.

Operations may include generating, using the processor, wager data that corresponds to the wagers that are identified to be printed (block 606). Operations include providing the player with the ticket that includes the wager data (block 608). In some embodiments, the ticket that is provided to the player is paper ticket is printed to display the wager data thereon. In some embodiments, the paper is retrieved from a paper roll and is printed to include all of the identified wager data on the ticket. In such embodiments, the length of the paper ticket may vary based on how many of the wagers are identified to be printed on the ticket.

In some embodiments, the ticket comprises image data is a virtual ticket and that may be transmitted to a user device. For example, the image data may be sent to a mobile device that is associated with the user. Some embodiments provide that the image data may be displayed on the mobile device. For example, redeeming the virtual ticket may be done by including a machine-readable code that is part of the image data.

Figure 7:
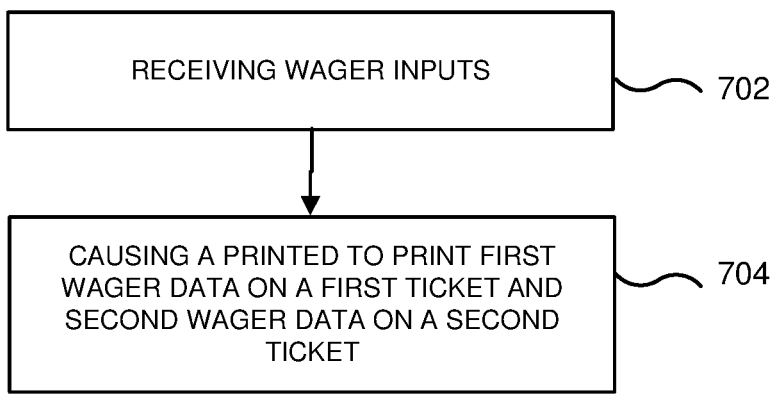
FIG. 7 is a flowchart illustrating operations of systems/methods/apparatus according to some embodiments.

Reference is now made to FIG. 7, which is a flowchart illustrating operations of systems/methods/apparatus according to some embodiments. Operations include receiving wager inputs corresponding to multiple wagers that correspond to predicted outcomes of multiple events (block 702). For example, the multiple events may include a first event and a second event. In some embodiments, the wager inputs are received a player via a user interface on a betting terminal. Operations include causing the printer to print first wager data corresponding to the first event on a first ticket and print second wager data corresponding to the second event on a second ticket. The wager data on each of the first and second tickets includes wager data corresponding to multiple different wagers. Some embodiments provide that the wager data on the first ticket includes wager data corresponding to the first event and the wager data on the second ticket includes wager data corresponding to the second event.

Figure 8:
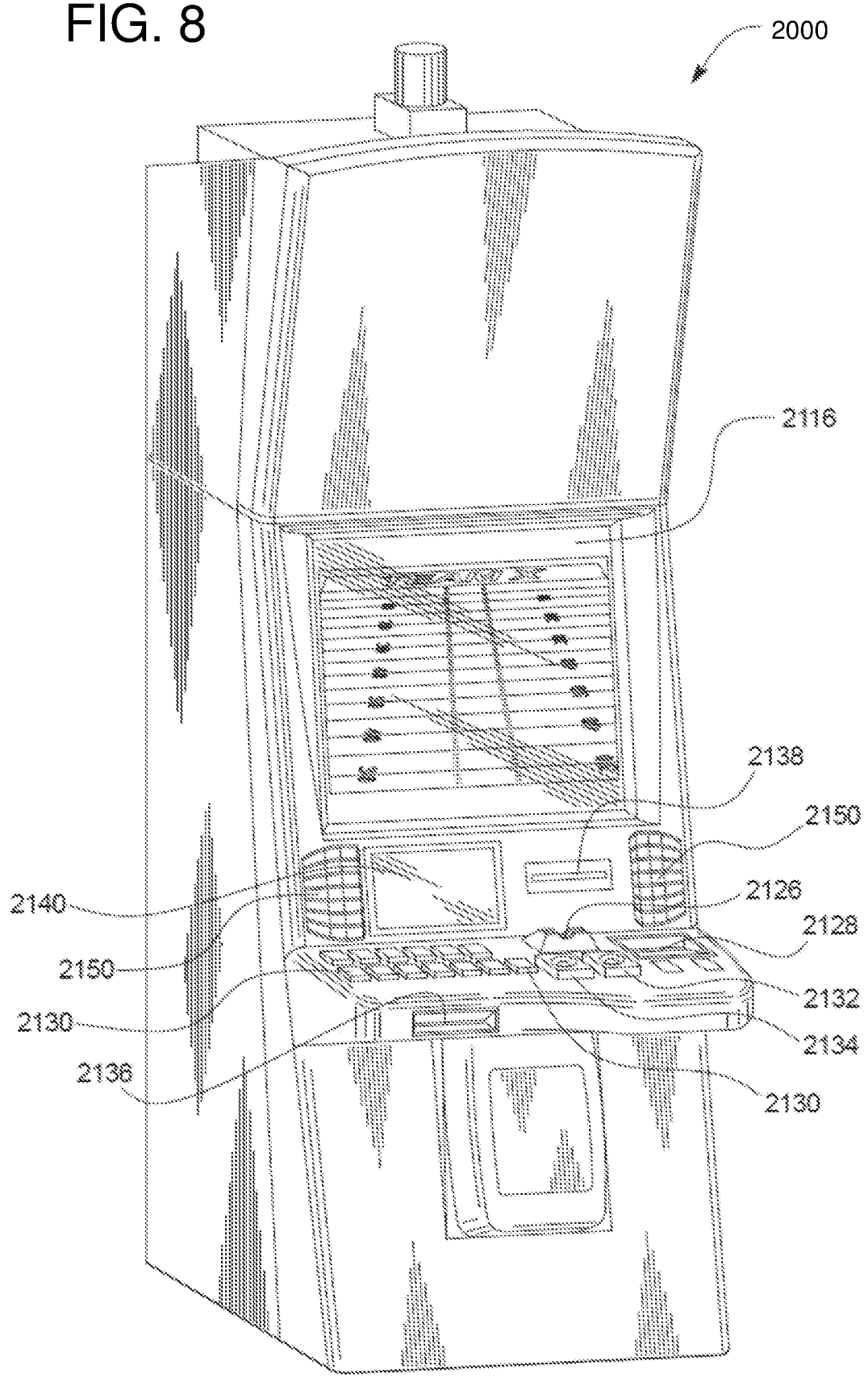
FIG. 8 is a perspective view of a betting terminal according to some embodiments herein.

Reference is now made to FIG. 8, which is a perspective view of a betting terminal according to some embodiments herein. The betting terminal 2000 is merely an example betting terminal and different betting terminals may be implemented using different combinations of the components shown and described herein. Although the below refers to betting terminals, in various embodiments personal gaming devices, such as mobile devices, may include some or all of the below components.

The example betting terminal 2000 includes a central display device 2116, a player tracking display 2140, a credit display 2120, and a bet display 2122. Although not illustrated, the central display device may include more than one displays. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the betting terminal are configured to display one or more game and/or non-game images, symbols, and indicia. In certain embodiments, the display devices of the betting terminal are configured to display any suitable visual representation or exhibition of the movement of objects; dynamic lighting; video images; images of people, characters, places, things, and faces of cards; and the like. In certain embodiments, the display devices of the betting terminal are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In some embodiments, betting terminal 2000 may include a ticket printer and dispenser 2136. In some embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In some embodiments, the betting terminal 2000 may include a sound generating device such as a plurality of speakers 2150. In some embodiments, the betting terminal 2000 provides dynamic sounds coupled with attractive multimedia images displayed on one or more of the display devices to provide an audio-visual representation or to otherwise display full-motion video with sound to attract players to the betting terminal. In certain embodiments, the betting terminal displays a sequence of audio and/or visual attraction messages during idle periods to attract potential players to the betting terminal. The videos may be customized to provide any appropriate information.

Some embodiments include a payment device configured to communicate with the at least one processor of the betting terminal to fund the betting terminal. In certain embodiments, the payment device includes one or more of: (a) a bill acceptor into which paper money is inserted to fund the betting terminal; (b) a ticket acceptor into which a ticket or a voucher is inserted to fund the betting terminal; (c) a coin slot into which coins or tokens are inserted to fund the betting terminal; (d) a reader or a validator for credit cards, debit cards, or credit slips into which a credit card, debit card, or credit slip is inserted to fund the betting terminal; (e) a player identification card reader into which a player identification card is inserted to fund the betting terminal; or (f) any suitable combination thereof. For example, betting terminal 2000 may include a combined bill and ticket acceptor 2128 and a coin slot 2126.

In some embodiments, the betting terminal 2000 includes a payment device configured to enable the betting terminal to be funded via an electronic funds transfer, such as a transfer of funds from a bank account. In another embodiment, the betting terminal includes a payment device configured to communicate with a mobile device of a player, such as a mobile phone, a radio frequency identification tag, or any other suitable wired or wireless device, to retrieve relevant information associated with that player to fund the betting terminal.

Some embodiments of the betting terminal include at least one wagering or betting device. In various embodiments, the one or more wagering or betting devices are each: (1) a mechanical button supported by the housing of the betting terminal (such as a hard key or a programmable soft key), or (2) an icon displayed on a display device of the betting terminal (described below) that is actuatable via a touch screen of the betting terminal (described below) or via use of a suitable input device of the betting terminal (such as a mouse or a joystick). One such wagering or betting device is as a maximum wager or bet device that, when actuated, causes the betting terminal to place a maximum wager on a play of a game. Another such wagering or betting device is a repeat bet device that, when actuated, causes the betting terminal to place a wager that is equal to the previously-placed wager on a play of a game. A further such wagering or betting device is a bet one device that, when actuated, causes the betting terminal to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In some embodiments, betting terminal 2000 may include a game play activation device in the form of a game play initiation button 2132. In some embodiments, the betting terminal 2000 begins game play automatically upon appropriate funding rather than upon utilization of the game play activation device.

In some embodiments, the betting terminal 2000 includes a cashout device, such as a cashout button 2134. In various embodiments, the cashout device is: (1) a mechanical button supported by the housing of the betting terminal (such as a hard key or a programmable soft key), or (2) an icon displayed on a display device of the betting terminal (described below) that is actuatable via a touch screen of the betting terminal (described below) or via use of a suitable input device of the betting terminal (such as a mouse or a joystick). When the betting terminal receives an actuation of the cashout device from a player and the player has a positive (i.e., greater-than-zero) credit balance, the betting terminal initiates a payout associated with the player's credit balance.

In some embodiments, the betting terminal 2000 includes one or more buttons 2130 that may be programmable by the betting terminal operator to, when actuated, cause the betting terminal to perform particular functions. For instance, such buttons may be hard keys, programmable soft keys, or icons icon displayed on a display device of the betting terminal (described below) that are actuatable via a touch screen of the betting terminal (described below) or via use of a suitable input device of the betting terminal (such as a mouse or a joystick).

In some embodiments, the betting terminal 2000 includes a touch-screen coupled to a touch-screen controller or other touch-sensitive display overlay to enable interaction with any images displayed on a display device (as described below). The touch-screen and the touch-screen controller may be connected to a video controller. In some embodiments, signals are input to the betting terminal by touching the touch screen at the appropriate locations.

In some embodiments, the betting terminal 2000 includes a card reader 2138. The card reader 2138 may be configured to read a player identification card inserted into the card reader.

The betting terminal 2000 may include a wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The betting terminal 2000 may include a wired/wireless power distribution component includes components or devices that are configured to provide power to other devices. For example, in some embodiments, a power distribution component includes a magnetic induction system that is configured to provide wireless power to one or more player input devices near the betting terminal. In some embodiments, a player input device docking region is provided, and includes a power distribution component that is configured to recharge a player input device without requiring metal-to-metal contact. In some embodiments, a power distribution component is configured to distribute power to one or more internal components of the betting terminal, such as one or more rechargeable power sources (e.g., rechargeable batteries) located at the betting terminal.

In various embodiments, the betting terminal 2000 includes multiple communication ports configured to enable the at least one processor of the betting terminal to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, the betting terminal 2000 has a support structure, housing, or cabinet that provides support for a plurality of the input devices and the output devices of the betting terminal. Further, the betting terminal 2000 is configured such that a player may operate it while standing or sitting. In various embodiments, the betting terminal 2000 is positioned on a base or stand, or is configured as a pub-style tabletop game (not shown) that a player may operate typically while sitting. Betting terminals 2000 may have varying housing and display configurations.

In some embodiments, the betting terminal 2000 is a device that has obtained approval from a regulatory gaming commission, and in other embodiments, the betting terminal 2000 is a device that has not obtained approval from a regulatory gaming commission.

In some embodiments, the gaming system includes one or more servers configured to communicate with a personal gaming device—such as a smartphone, a tablet computer, a desktop computer, or a laptop computer—to enable web-based game play using the personal gaming device. In some embodiments, the player must first access a gaming website via an Internet browser of the personal gaming device or execute an application (commonly called an "app") installed on the personal gaming device before the player can use the personal gaming device to participate in web-based game play. In some embodiments, the one or more servers and the personal gaming device operate in a thin-client environment. In some embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In some embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique playername and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes a betting terminal configured to communicate with a personal gaming device—such as a smartphone, a tablet computer, a desktop computer, or a laptop computer—to enable tethered mobile game play using the personal gaming device. Generally, in these embodiments, the betting terminal establishes communication with the personal gaming device and enables the player to play games on the betting terminal remotely via the personal gaming device. In certain embodiments, the gaming system includes a geo-fence system that enables tethered game play within a particular geographic area but not outside of that geographic area.

Other Betting Terminal Features

Embodiments described herein may be implemented in various configurations for betting terminals 100, including but not limited to: (1) a dedicated betting terminal, wherein the computerized instructions for controlling any wagering opportunities (which are provided by the betting terminal) are provided with the betting terminal prior to delivery to a gaming establishment; and (2) a changeable betting terminal, where the computerized instructions for controlling any wagering opportunities (which are provided by the betting terminal) are downloadable to the betting terminal through a data network when the betting terminal is in a gaming establishment. In some embodiments, the computerized instructions for controlling any wagering opportunities are executed by at least one central server, central controller or remote host. In such a "thin client" embodiment, the central server remotely controls any games (or other suitable interfaces) and the betting terminal is utilized to display such games (or suitable interfaces) and receive one or more inputs or commands from a player. In another embodiment, the computerized instructions for controlling any wagering opportunities are communicated from the central server, central controller or remote host to a betting terminal local processor and memory devices. In such a "thick client" embodiment, the betting terminal local processor executes the communicated computerized instructions to control any wagering opportunities (or other suitable interfaces) provided to a player.

In some embodiments, a betting terminal may be operated by a mobile device, such as a mobile telephone, tablet other mobile computing device. For example, a mobile device may be communicatively coupled to a betting terminal and may include a user interface that receives user inputs that are received to control the betting terminal. The user inputs may be received by the betting terminal via the mobile device.

In some embodiments, one or more betting terminals in a wagering system may be thin client betting terminals and one or more betting terminals in the wagering system may be thick client betting terminals. In another embodiment, certain functions of the betting terminal are implemented in a thin client environment and certain other functions of the betting terminal are implemented in a thick client environment. In one such embodiment, computerized instructions for controlling any wagering opportunities are communicated from the central server to the betting terminal in a thick client configuration and computerized instructions for controlling any secondary wagering opportunities or bonus functions are executed by a central server in a thin client configuration.

The present disclosure contemplates a variety of different wagering systems each having one or more of a plurality of different features, attributes, or characteristics. It should be appreciated that a "wagering system" as used herein refers to various configurations of: (a) one or more central servers, central controllers, or remote hosts; (b) one or more betting terminals; and/or (c) one or more personal betting terminals, such as desktop computers, laptop computers, tablet computers or computing devices, personal digital assistants (PDAs), mobile telephones such as smart phones, and other mobile computing devices.

In certain such embodiments, computerized instructions for controlling any wagering opportunities (such as any primary or base wagering opportunities and/or any secondary or bonus wagering opportunities) displayed by the betting terminal are executed by the central server, central controller, or remote host. In such "thin client" embodiments, the central server, central controller, or remote host remotely controls any games (or other suitable interfaces) displayed by the betting terminal, and the betting terminal is utilized to display such games (or suitable interfaces) and to receive one or more inputs or commands. In other such embodiments, computerized instructions for controlling any wagering opportunities displayed by the betting terminal are communicated from the central server, central controller, or remote host to the betting terminal and are stored in at least one memory device of the betting terminal. In such "thick client" embodiments, the at least one processor of the betting terminal executes the computerized instructions to control any games (or other suitable interfaces) displayed by the betting terminal.

In some embodiments in which the wagering system includes: (a) an betting terminal configured to communicate with a central server, central controller, or remote host through a data network; and/or (b) a plurality of betting terminals configured to communicate with one another through a data network, the data network is an internet or an intranet. In certain such embodiments, an internet browser of the betting terminal is usable to access an internet game page from any location where an internet connection is available. In one such embodiment, after the internet wagering page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the betting terminal, such as by identifying the MAC address or the IP address of the internet facilitator. In various embodiments, once the central server, central controller, or remote host identifies the player, the central server, central controller, or remote host enables placement of one or more wagers on one or more plays of one or more primary or base wagering opportunities and/or one or more secondary or bonus wagering opportunities, and displays those plays via the internet browser of the betting terminal.

It should be appreciated that the central server, central controller, or remote host and the betting terminal are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of betting terminals to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:
   a communication interface;
   a user interface;
   a processing circuit;
   a ticket printer that prints tickets that display wager data; and
   a memory coupled to the processing circuit, the memory comprising machine readable instructions that, when executed by the processing circuit, cause the processing circuit to:
   receive, from a player via the user interface, wager inputs corresponding to a plurality of wagers that correspond to predicted outcomes of a plurality of events;
   identify which of the plurality of wagers to memorialize on a ticket; and
   cause the printer to print the ticket that comprises wager data corresponding to multiple ones of the plurality of wagers that are identified to print,
   wherein the plurality of wagers comprises a first portion of wagers that comprises winning wagers comprising outcomes that occur during a given time interval and that correspond to wagers that the player wins,
   wherein the ticket is printed after the given time interval and comprises wager data corresponding to the first portion of the plurality of wagers,
   wherein the plurality of wagers comprises a second portion of wagers that comprises non-winning wagers comprising outcomes that occur during the given time interval and that correspond to wagers that the player loses, and
   wherein the ticket is printed without printing wager data corresponding to the second portion of wagers.

2. The system of claim 1, wherein the plurality of wagers comprises a third portion of wagers comprising outcomes that occur during a given time interval.

3. The system of claim 2, wherein the given time interval begins responsive to the player logging in via the user interface and ends responsive to the player logging out via the user interface.

4. The system of claim 2, wherein the given time interval begins responsive to receiving a first wager of the plurality of wagers and ends responsive to receiving a cashout signal from the player via the user interface.

5. The system of claim 2, wherein the given time interval comprises a first time interval and a second time interval that is after the first time interval,
   wherein the third portion of wagers comprise outcomes that occur during the first time interval,
   wherein the plurality of wagers further comprises a fourth portion of wagers comprising outcomes that occur during the second time interval, and wherein the ticket is printed after the first time interval and comprises wager data corresponding to the fourth portion of wagers and not the third portion of wagers.

6. The system of claim 2, wherein the given time interval comprises a first time interval and a second time interval that is different than the first time interval,
wherein a first event occurs during the first time interval and a second event occurs during the second time interval,
wherein the ticket comprises a first ticket that comprises wager data corresponding to the first event and a second ticket that is different from the first ticket and that comprises wager data corresponding to the second event.

7. The system of claim 1, wherein the plurality of wagers comprises a third portion of wagers that are based on a first type of event and a fourth portion of wagers that are based on a second type of event, and
wherein the ticket comprises a first ticket that comprises wager data corresponding to the third portion of wagers and the first type of event and a second ticket that comprises wager data corresponding to the fourth portion of wagers and the second type of event.

8. The system of claim 1, wherein the ticket comprises a virtual ticket comprising an image corresponding to wager data.

9. The system of claim 8, wherein the processing circuit further causes the virtual ticket to be transmitted, via the communication interface, to a computing device that is associated with the player.

10. The system of claim 1, wherein the processing circuit further causes the printer to print the ticket that comprises the wager data and cash balance data corresponding to a cash balance transferred to the player.

11. The system of claim 10, wherein the wager data comprises a first encoded image,
wherein the cash balance data comprises a second encoded image, and
wherein the first and second encoded images are readable by an optical reader.

12. The system of claim 1, wherein the ticket comprises wager data corresponding to all of the wagers placed during a wagering session.

13. The system of claim 12, wherein the plurality of wagers comprises settled wagers comprising determined outcomes and unsettled wagers comprising undetermined outcomes, and
wherein the ticket comprises a first group of wager data corresponding to the settled wagers and a second group of wager data corresponding to the unsettled wagers, wherein the first and second groups are visually distinctive from one another on the ticket.

14. The system of claim 1, wherein the user interface is configured to receive a ticket printing input that identifies which of the plurality of wagers to memorialize on the ticket, and
wherein, responsive to receiving the ticket printing input, the ticket comprises wager data corresponding to the ticket printing input.

15. A method comprising:
receiving, via a user interface, a plurality of wager inputs corresponding to a plurality of wagers that are made by a player during a wagering session;
identifying, using a processing circuit, ones of the plurality of wagers to memorialize on a ticket that is provided to the player;
generating, using the processor, wager data that corresponds to the ones of the plurality of wagers that are identified to be printed; and
providing the player with the ticket that comprises the wager data,
wherein the plurality of wagers comprises a first portion of wagers that comprises non-winning wagers comprising outcomes that correspond to wagers that the player loses, and
wherein the ticket is printed without printing wager data corresponding to the first portion of wagers.

16. The method of claim 15, wherein providing the player with the ticket comprises printing the ticket to display the wager data,
wherein the plurality of wagers comprises a second portion of wagers that comprise outcomes that are determined in a given time interval and a third portion of wagers that comprise outcomes that are not determined during in the given time interval,
wherein the third portion of wagers comprise wager data that corresponds to the wagers that are identified to be printed without printing the second portion of wagers.

17. The method of claim 15, wherein the ticket comprises image data that is transmitted to a user device and that is configured to be displayed on the user device.

18. An apparatus comprising:
a user interface;
a processing circuit;
a ticket printer that prints tickets that display wager data; and
a memory coupled to the processing circuit, the memory comprising machine readable instructions that, when executed by the processing circuit, cause the processing circuit to:
receive, from a player via the user interface, wager inputs corresponding to a plurality of wagers that correspond to predicted outcomes of a plurality of events that comprises a first event and a second event; and
cause the printer to print first wager data corresponding to the first event on a first ticket and to print second wager data corresponding to the second event on a second ticket,
wherein each of the first and second tickets comprises wager data corresponding to multiple ones of the plurality of wagers,
wherein the plurality of wagers comprises a first portion of wagers that comprises non-winning wagers comprising outcomes that correspond to wagers that the player loses, and
wherein the first ticket is printed without printing wager data corresponding to the first portion of wagers.

* * * * *